United States Patent
Kim et al.

(10) Patent No.: US 10,027,660 B2
(45) Date of Patent: Jul. 17, 2018

(54) COMPUTER PROGRAM, METHOD, AND SYSTEM FOR SECURE DATA MANAGEMENT

(71) Applicant: Data Locker Inc., Overland Park, KS (US)

(72) Inventors: Jay Kim, Leawood, KS (US); Kean Sananikone, Olathe, KS (US); Yong Duk Lee, Seoul (KR)

(73) Assignee: DataLocker Inc., Overland Park, KS (US)

( * ) Notice: Subject to any disclaimer, the term of this patent is extended or adjusted under 35 U.S.C. 154(b) by 0 days.

(21) Appl. No.: 14/757,803

(22) Filed: Dec. 23, 2015

(65) Prior Publication Data
US 2016/0180102 A1    Jun. 23, 2016

Related U.S. Application Data

(60) Provisional application No. 62/096,378, filed on Dec. 23, 2014.

(51) Int. Cl.
*H04L 29/06* (2006.01)
*G06F 12/14* (2006.01)
(Continued)

(52) U.S. Cl.
CPC ...... *H04L 63/0861* (2013.01); *G06F 12/1408* (2013.01); *G06F 21/6209* (2013.01);
(Continued)

(58) Field of Classification Search
CPC ........ G06F 21/62; G06F 21/60; G06F 21/602; G06F 21/52; H04L 9/08; H04L 9/0861; H04L 9/0897
(Continued)

(56) References Cited

U.S. PATENT DOCUMENTS 5,862,217 A † 1/1999 Steinberg
6,021,429 A * 2/2000 Danknick ......... H04L 29/12009
709/208
(Continued)

FOREIGN PATENT DOCUMENTS

JP   H10164095   6/1998
WO  2014/138882 A1  9/2014

OTHER PUBLICATIONS

Search Report and Written Opinion dated May 6, 2016 for related PCT Patent Application No. PCT/IB15/59959, 12 pages.

*Primary Examiner* — Jeffrey Pwu
*Assistant Examiner* — Samuel Ambaye
(74) *Attorney, Agent, or Firm* — Hovey Williams LLP

(57) ABSTRACT

A computer-implemented method for providing secure data management. The method includes obtaining data via a computing device, with the obtained data not being stored on non-volatile memory elements of the computing device. The method additionally includes encrypting the obtained data using a cryptographic key to generate encrypted data. Thereafter, the encrypted data is transmitted, via a communications network, to a server device for storage. The method additionally includes retrieving the encrypted data from the server. The method further includes decrypting the encrypted data to obtain decrypted data.

16 Claims, 3 Drawing Sheets

(51) Int. Cl.
*H04L 9/08* (2006.01)
*G06F 21/62* (2013.01)

(52) U.S. Cl.
CPC .......... *H04L 9/0861* (2013.01); *H04L 9/0897* (2013.01); *H04L 63/0428* (2013.01); *H04L 63/083* (2013.01); *G06F 2212/402* (2013.01)

(58) Field of Classification Search
USPC ........................................................ 713/164
See application file for complete search history.

(56) References Cited

U.S. PATENT DOCUMENTS

| | | |
|---|---|---|
| 2002/0188858 A1† | 12/2002 | Oerlemans |
| 2008/0098038 A1* | 4/2008 | Motoyama ........ G06F 17/30067 |
| 2008/0104709 A1* | 5/2008 | Averyt ................ G06F 21/6218 |
| | | 726/27 |
| 2009/0037515 A1† | 2/2009 | Zapata et al. |
| 2009/0086978 A1 | 4/2009 | McAvoy et al. |
| 2009/0147949 A1* | 6/2009 | Kirovski ............... H04L 9/3226 |
| | | 380/44 |
| 2010/0095118 A1 | 4/2010 | Meka |
| 2013/0212401 A1 | 8/2013 | Lin |
| 2014/0093083 A1* | 4/2014 | Dadu ...................... G06F 21/62 |
| | | 380/275 |
| 2016/0028699 A1* | 1/2016 | Ambroz .............. H04L 63/0428 |
| | | 713/168 |

\* cited by examiner
† cited by third party

COMPUTER PROGRAM, METHOD, AND SYSTEM FOR SECURE DATA MANAGEMENT

RELATED APPLICATIONS

This non-provisional patent application claims priority benefit, with regard to all common subject matter, of earlier-filed U.S. Provisional Patent Application No. 62/096,378, filed Dec. 23, 2014, and entitled "COMPUTER PROGRAM, METHOD, AND SYSTEM FOR SECURE DATA MANAGEMENT." The identified earlier-filed provisional patent application is hereby incorporated by reference in its entirety into the present non-provisional patent application.

FIELD

Embodiments of the present invention are directed to a computer program, a method, and a system for secure data management. In more detail, embodiments of the present invention are directed to a computer program, method, and system for capturing various forms of data, such as images, audio, and/or video, for encrypting such data, and for transmitting such data in encrypted form for storage.

BACKGROUND

With the increasing use of mobile computing devices, data security has become an issue of primary importance. Various reports indicate that there are increasing numbers of malicious attacks on mobile computing devices, with the purposes of such attacks being to compromise the data residing on the mobile computing devices. For instance, malicious entities have been known to hack into mobile computing devices to steal private images and videos of the owners and/or users of the mobile computing devices. Common mobile computing devices offer limited security for the data that is captured by and that is stored on such mobile computing devices. For example, images and videos obtained by a user, via the user's computing device, are generally stored, unprotected on the non-volatile memory elements of the computing device.

Thus, there is a need for a computer program, a method, and a system that provides for secure capture, transmission, storage, and retrieval of data. In particular, there is a need for a computer program, method, and system that allows a computing devices to obtain data, but which restricts such obtained data from being compromised (e.g., hacked) in an accessible form. Additionally, there is a need to provide secure data transmission, such that if a data transmission is compromised, intercepted data cannot be recovered in an accessible form.

SUMMARY

Embodiments of the present invention include computer programs, methods, and systems for secure data management. For example, embodiments may include a computer-implemented method, or a non-transitory computer readable medium with a computer program stored thereon, for providing secure data management. The method may include the step of obtaining data, via a computing device, with the obtained data not being stored on non-volatile memory elements of the computing device. The method may additionally include encrypting the obtained data using a cryptographic key to generate encrypted data. Thereafter, the encrypted data may be transmitted, via a communications network, to a server for storage. The method may additionally include the step of retrieving the encrypted data from the server. A further step of the method may include decrypting the encrypted data to obtain decrypted data.

Embodiments of the present additionally include an additional computer-implemented method, or an additional one or more non-transitory computer readable mediums with computer programs stored thereon, for providing secure data management. The method may include the step of obtaining data, via a first computing device, with the obtained data is not stored on non-volatile memory elements of the first computing device. The method may additionally include encrypting the obtained data using a cryptographic key to generate encrypted data. The method may additionally include transmitting the encrypted data, via a first communications network, to a server for storage. The method may additionally include retrieving the encrypted data from the server, via a second communications network, with the encrypted data being retrieved onto a second computing device. A further step of the method may include decrypting the encrypted data, via the second computing device, to obtain decrypted data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
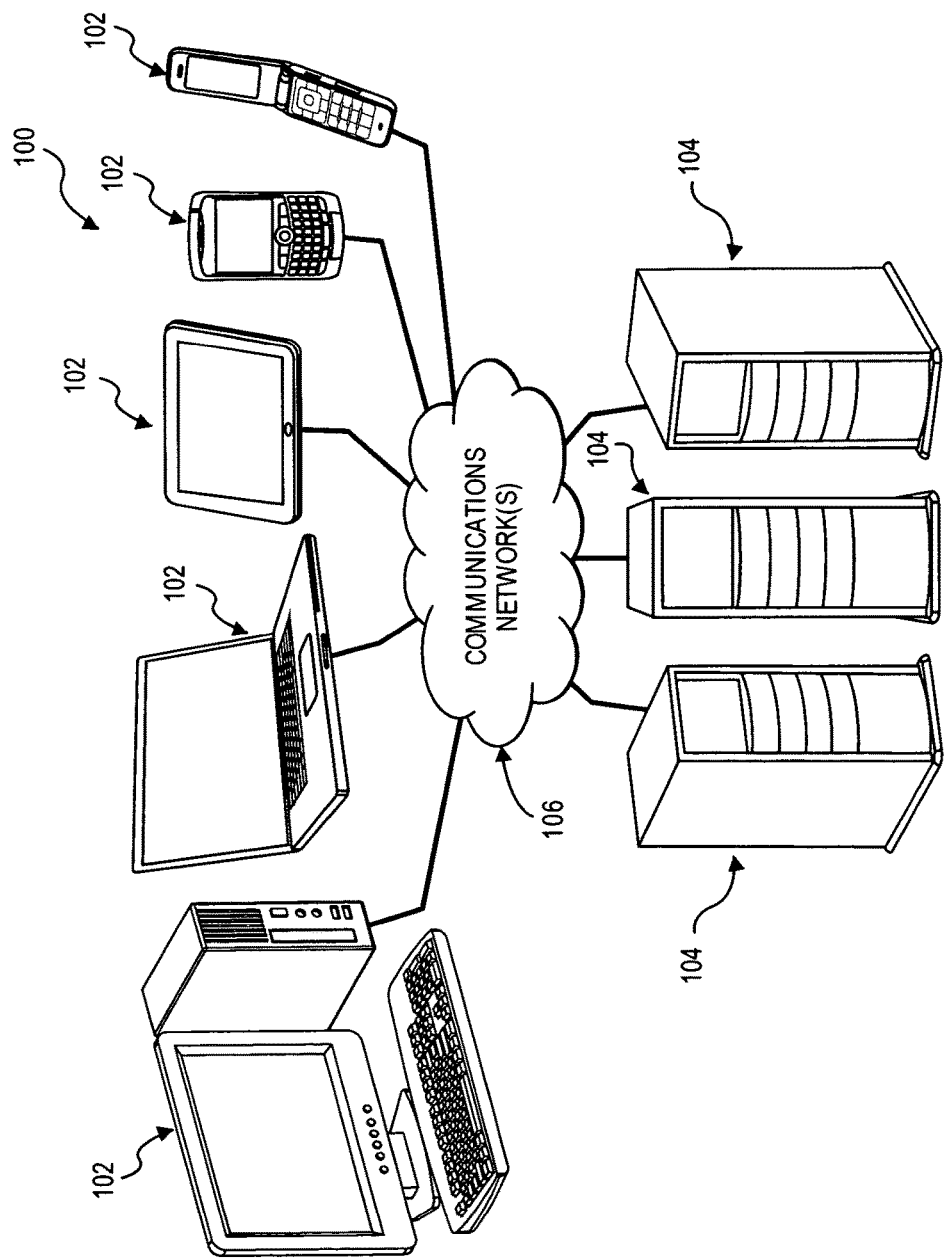
FIG. 1 is a schematic diagram of a system for secure data management according to embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

The present invention provides various embodiments of a computer program, a method, and a system for secure data management, including data capture, transmission, and storage. As used herein, data may comprise any type of digital or analog information. For example, such data may be in the form of text, audio, images, graphics, video, or the like. However, it is understood that embodiments of the present invention may also be directed to managing other types of data, such as data structures, databases, computer programs, applications, software, or the like. Regardless, the computer program, method, and system of embodiments of the present invention provide an electronic resource, such as an online application, a general computer program, or a mobile application (i.e., an "app"), which allows a user to capture, transmit, store, and retrieve data in a secure fashion.

System Description

With reference to FIG. 1, the computer program, system, and method of embodiments of the present invention may be implemented in hardware, software, firmware, or combinations thereof, using a secure data management system 100, which broadly comprises one or more computing devices 102, one or more server devices 104, and a communications network 106.

The computing devices 102 and the server devices 104 may include any device, component, or equipment with one or more processing elements and associated memory elements. The processing elements may implement operating systems, and may be capable of executing the computer program, which is also generally known as instructions, commands, software code, executables, applications, apps, and the like. The processing elements may include processors, coprocessors, microprocessors, microcontrollers, field programmable gate arrays (FPGAs), and the like, or combinations thereof. The memory elements may be capable of storing or retaining the computer program and may also store data, typically binary data, including text, databases, graphics, audio, video, combinations thereof, and the like. The memory elements may also be known as a "computer-readable storage medium" and may include random access memory (RAM), read only memory (ROM), flash drive memory, floppy disks, hard disk drives, removable memory devices, optical storage media such as compact discs (CDs or CDROMs), digital video disc (DVD), Blu-Ray™, and the like, or combinations thereof.

The computing device 102 may specifically include mobile communication devices (including wireless devices), work stations, desktop computers, laptop computers, palm-top computers, tablet computers, portable digital assistants (PDA), smartphones, and the like, or combinations thereof. In preferred embodiments, the computing device 102 will include an image-capturing device such as a digital camera, a video camera, an optical scanner, or the like, which allows the computing device 102 to capture image and/or video data. In additional embodiments, the computing device 102 may include a microphone for obtaining audio data. In some embodiments, the computing device 102 will have an electronic display, such as a liquid crystal display or touch screen that is operable to display visual graphics, video, images, text, etc. In certain embodiments, the computer program of the present invention facilitates interaction and communication with the computing device 102 through a graphical user interface (GUI) that is displayed via the electronic display. The GUI enables the user to interact with the electronic display by touching or pointing at display areas to provide information to the user control interface, discussed in more detail below.

In more detail, the computing device 102 may include a user control interface that enables one or more users to share information and commands with the computing device 102. The user control interface may comprise one or more functionable inputs such as buttons, keyboard, switches, scrolls wheels, voice recognition elements such as the microphone, pointing devices such as a mouse, a touchpad, a tracking ball, a stylus, or the like. Further, the computing device 102 may comprise wired or wireless data transfer elements, such as a communication component, removable memory, data transceivers, and/or transmitters, or the like. Similarly, the computing devices 102 may include one or more data transceivers for sending receiving data wired or wirelessly.

The server devices 104 may specifically include computational devices that provide access to one or more general computing resources, such as remote data storage services (e.g., cloud data storage), web services, data transfer services, and the like. For embodiments in which the server devices 104 provide access to remote data storage services, the server devices 104 may include data file stores comprising a plurality of local hard disk drives, networked hard disk drives, and/or other separated data storage devices connected via one or more networks. In some embodiments, the networks may comprise one or more virtual or mesh networks and may provide a virtualized infrastructure of logical pools in which data can be stored. Such logic pools may be grouped according to a plurality of different physical storage devices, with such physical storage devices perhaps being physically separated. In some embodiments, the server devices 104 may also provide access to a database that stores information related to the operation and implementation of embodiments of the present invention.

The communications network 106 may include any type of standard data transfer networks (including combinations of two or more data transfer networks), including those data transfer networks implementing any standard or non-standard wired or wireless protocols. For instance, the communications network 106 may comprise wireless networks, including cellular (e.g., 4G LTE networks offered by Sprint™, Verizon™, T-Mobile™), WiFi™, Bluetooth™, or the like. Alternatively, the communications network 106 may be wired and may include servers, routers, switches, and the like, as well as electrically conductive cables or optical cables. The communications network 106 may also include local, metro, or wide area networks, as well as the Internet, and/or cloud networks.

The server devices 104 and the computing devices 102 may each be connected to the communications network 106. As such, server devices 104 may communicate with computing devices 102 or with other server devices 104 through the communications network 106. Likewise, computing devices 102 may be able to communicate with other computing devices 102 or with server devices 104 through the communications network 106. As described above, the connection to the communications network 106 may be wired or wireless. Thus, the server devices 104 and the computing devices 102 may include the appropriate components necessary to establish a wired or a wireless connection.

The computer program (e.g., program, code, or instructions) of the present invention may run on one or more computing devices 102 or, alternatively, may run on one or more server devices 104. In some embodiments, a first portion of the program, code, or instructions may execute on a first computing device 102 or a first server device 104, while a second portion of the program, code, or instructions may execute on a second computing device 102 or a second server device 104. In some embodiments, other portions of the program, code, or instructions may execute on other computing devices 102 or server devices 104 as well. The various functions, features, actions and calculations described herein as being performed by or using the computer program may actually be performed by one or more computers, processors, or other computational devices, such as the computing devices 102 and/or server devices 104, independently or cooperatively executing portions of the computer program. For example, information related to the secure data management system 100 may be stored on a memory element associated with the server device 104, such that the information is remotely accessible to users of the computer program via one or more computing devices 102. Alternatively, the information may be directly stored on the memory element associated with the one or more computing devices 102 of the user. In additional embodiments of the present invention, a portion of the information may be stored on the server device 104, while another portion may be stored on the one or more computing devices 102.

In certain embodiments of the present invention, the computer program may be embodied in a stand-alone computer program downloaded on a computing device 102 of a user, or in a web-accessible program that is accessible by the user's computing device 102 via the communications network 106. For the stand-alone computer program, a downloadable version of the computer program may be stored, at least in part, on a server device 104. A user can download at least a portion of the computer program onto the user's computing device 102 via the communications network 106. In such embodiments of the present invention, the computer program may be an "application," such as an "app" for a mobile device. After the computer program has been downloaded, the computer program can be installed on the computing device 102 in an executable format. The executable form of the computer program permits the user to access embodiments of the present invention via the electronic resource, such as via a mobile "app" or a website. For the web-accessible computer program, the user may simply access the computer program via the communications network 106 (e.g., the Internet) with the computing device 102.

Upon a user accessing the electronic resource for a first time, the user may be required to provide certain types of identification information to create an account, with which to access certain functions and features. Such identification information may include, for instance, personal name, business name, organization name, physical address, email address, telephone number, or the like. Upon providing the identification information, the user may also be required to provide (or may be given) security credentials, which are used as a security measure to verify the user's identity and/or authority to access certain functions and features of embodiments of the present invention. For instance, embodiments may provide for the security credentials to include a username and password verification, biometric data (e.g., voice information, iris information, or fingerprint information), or the like or combinations thereof.

Operation

Embodiments of the present invention comprise a computer program, a system, and a method for secure data management, with such data management including secure data capture, storage, transmission, and retrieval. One or more of the various operations, functions, steps, and/or features described below may be performed by a user's computing device 102 implementing the computer program of embodiments of the present invention.

Figure 2:
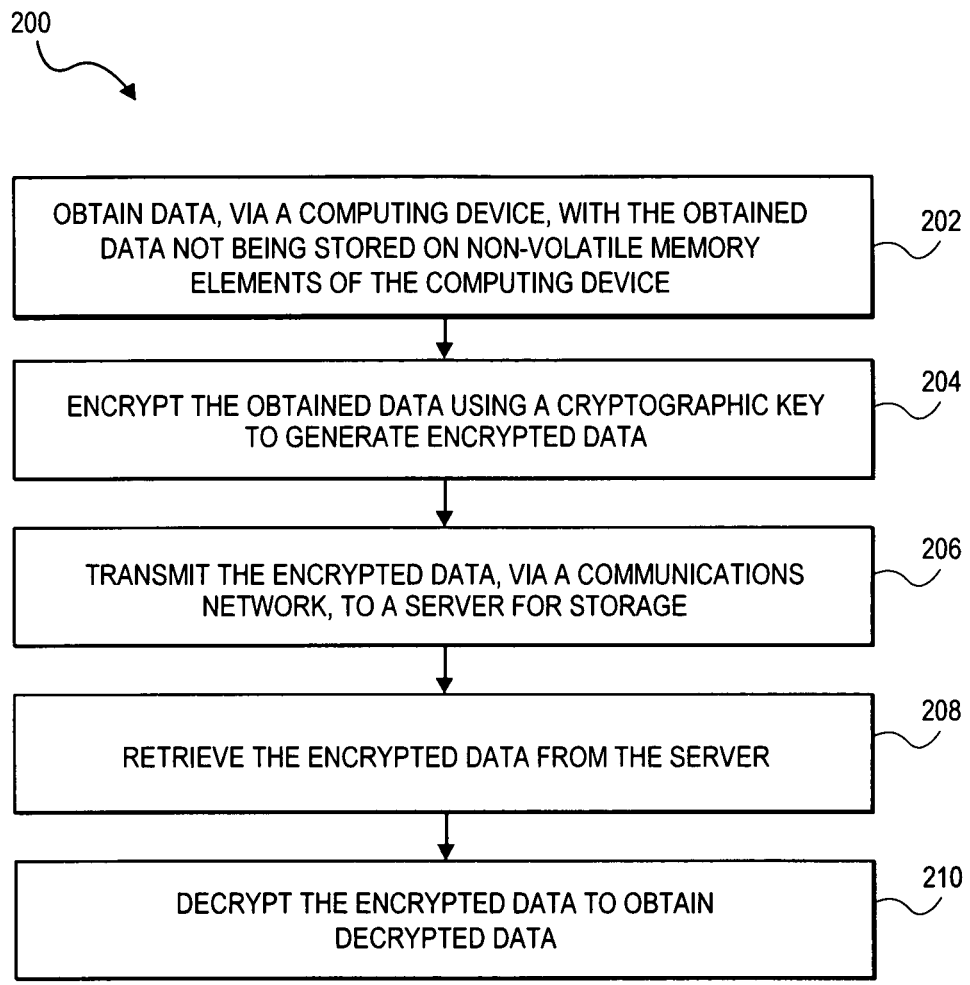
FIG. 2 is a flowchart of a method for secure data management according to one embodiment of the present invention.

For example, embodiments of the present invention broadly include a method 200, as illustrated in FIG. 2, which comprises an initial Step 202 of obtaining data, via a computing device 102, with the obtained data not being stored on non-volatile memory elements of the computing device 102. An additional Step 204 includes encrypting the obtained data using a cryptographic key to generate encrypted data. An additional Step 206 includes transmitting the encrypted data, via a communications network 106, to a server 104 for storage. An additional Step 208 includes retrieving the encrypted data from the server 104. A further Step 210 includes decrypting the encrypted data to obtain decrypted data.

In more detail, a user can capture, or otherwise obtain, various types of data with the user's computing device 102. For example, the user may capture a digital image or a video via the computing device's 102 image-capturing device (i.e., the camera). Alternatively, or simultaneously, the user may capture audio data via the computing device's 102 microphone. As such for instance, the user may capture a combination of video and audio data. In still further embodiments, the user may obtain, via the user's computing device 102, other forms of data, such as textual data, data structures, computer programs, applications, or the like.

Regardless of the type of data captured and/or obtained, embodiments of the present invention provide for the captured data to only be stored within volatile (i.e., transient or non-persistent) memory elements of the computing device 102. As such, the data may not be stored within the non-volatile (i.e., non-transient or persistent) storage memory elements associated with the computing device 102. For example, the captured data may only be temporarily stored on the computing device's 102 volatile memory elements, such as on the computing device's 102 random access memory (RAM), which may include DDR SDRAM (e.g., DDR1, DDR2, DDR3), LPDDR (e.g., LPDDR1 or LPDDR2), or the like. Contrastingly, however, the captured data may not be stored on the computing device's 102 non-volatile memory elements, such as the computing device's 102 read only memory (ROM), EPROM, EEPROM, flash memory (e.g., non-removable or removable SD cards), F-RAM, hard disks, optical discs, magnetic tapes, holographic memory, or the like.

Once the data has been captured and/or otherwise obtained by the computing device 102, embodiments of the present invention will immediately encrypt the captured data so that the plaintext form of the captured data cannot be read or interpreted unless the encrypted data it is subsequently decrypted. Embodiments of the present invention provide for the captured data to be encrypted using an encryption scheme that may implement a random or a pseudo-random cryptographic key. In certain embodiments, the encryption scheme may be a symmetric-key scheme, in which the cryptographic key used to encrypt the collected data is the same key as the cryptographic key used to decrypt the encrypted data. In other embodiments, the encryption scheme may be a public-key scheme, in which a first cryptographic key is used to encrypt the captured data and is publically available, while a second cryptographic key is required to decrypt the encrypted data. With such a public-key scheme, the first cryptographic key is different from the second cryptographic key, and the second cryptographic key is kept private at all times. Embodiments of the present invention additionally contemplate the use of one-time pad encryption schemes.

As noted above, embodiments of the present invention provide for a cryptographic key to be used as part of an encryption algorithm for encrypting and/or for decrypting the captured data. For symmetric-encryption schemes, embodiments may implement 80-bit, 128-bit, 168-bit, or 256-bit cryptographic keys. For public-encryption schemes, embodiments may implement 1024-bit, 2048-bit, 3072-bit, or 15360-bit cryptographic keys (e.g., RSA or Diffie-Hellman keys). In other encryption scheme embodiments, elliptic curve cryptographic keys may be used. Regardless of the encryption scheme used, certain embodiments of the present invention provide for the cryptographic keys to be generated by the user's computing device 102, such as via the computer program of the present invention stored and executed on the user's computing device 102. Once generated, the cryptographic keys may be stored locally on the user's computing device 102, such as on one or more protected, non-volatile memory elements. Such protected memory elements may be associated with various security features that allow the protected memory elements to be accessed only after complying with such security features. For example, the security features may include verification of the security credentials, which may include username/password verification, biometric verification (e.g., voice, iris, or fingerprint identification), or the like or combinations thereof. In some embodiments, the user's computing device 102 may include the necessary components to facilitate such verification, such as keyboard, microphone, camera, eye scanner, fingerprint scanner, or the like.

Once the captured data has been encrypted, the encrypted data will be immediately transmitted from the user's computing device 102 to a server device 104 over the communications network 106. The encrypted data can be transmitted with any standard data protocol in its fully-encrypted form. In certain embodiments, the cryptographic key used to encrypt the captured data is not transmitted along with the encrypted data, so as to maintain the encrypted data in a secure form.

Upon the encrypted data being transmitted to the server device 104, embodiments of the present invention provide for all information related to the captured data and/or to the encrypted data to be deleted (i.e., "wiped" or "removed") from the computing device 102. Specifically, for instance, embodiments may provide for the captured data to be erased from the volatile memory elements of the computing device 102 on which the captured data was temporarily maintained for encryption and transmission purposes. Similarly, once the encrypted data has be transmitted, embodiments may provide for the encrypted data to be erased from the volatile memory elements of the computing device 102 on which the encrypted data was temporarily maintained for encryption and transmission purposes. In certain embodiments, all traces of the information related to the captured data and/or the encrypted will be removed from the memory elements of the computing device 102 by simply disconnecting the volatile memory elements from their power source. In other embodiments, the volatile memory elements, or the portions of the volatile memory elements associated with the captured and/or encrypted data, may be overwritten with random data at least once, twice, three times, or more. Furthermore, although the above description provides for the memory elements to be wiped of the captured data upon transmission of the encrypted data, some embodiments provide for the memory elements to be immediately wiped of the captured data upon the captured data being encrypted into encrypted data.

As previously discussed, the communications network 106 may include any type of wired or wireless network. As such, the encrypted data may be transmitted to the server device 104 over such wired or wireless networks. In embodiments in which the user's computing device does not have immediate access to a network associated with the communications network 106, the encrypted data may remain stored on the computing devices 102 volatile memory elements until the computing device has access to the communications network 106. At such time, the encrypted data will be immediately transmitted to the server device 104. Regardless, in instances in which a communications network 106 is unavailable, embodiments may provide for the captured data to be wiped from the volatile memory elements as soon as it has been encrypted.

As previously noted, the server device(s) 104 may comprise a remote data storage location, such as that provides cloud-based storage. As such, the encrypted data will be stored remotely on the server device 104 in encrypted form until a user chooses to retrieve it. Embodiments of the present invention contemplate that a user can retrieve the encrypted data from the server device 104, via the communications network 106, and onto (1) the original computing device 102 of the user (i.e., the computing device 102 that was used to capture or obtain the data), and/or (2) a secondary computing device 102 approved by the user.

For the original computing device 102, the user may simply retrieve, e.g., download, the encrypted data from the server device 104 via the communications network 106. Once the encrypted data has been retrieved, the user can decrypt the encrypted data using the cryptographic key stored on the original computing device 102. In some embodiments, the user's security credentials may need to be entered and verified before the encrypted data can be decrypted. The decrypted data (i.e., the plaintext of the originally-captured data) can then be accessed, opened, read, viewed, or the like, via the original computing device 102. In certain embodiments, the decrypted data may be stored on the original computing device's 102 non-volatile memory elements for future access and use. In other embodiments, after accessing the decrypted data, the user may select for the decrypted data to be re-encrypted and transmitted back to the server device 104, as well as have the memory elements of the original computing device 102 that were associated with the decrypted and/or re-encrypted data wiped clean of all information associated with the decrypted and/or re-encrypted data.

In alternative embodiments, the user may provide for the encrypted data to be retrieved from the server device 104 onto a secondary computing device 102 (different from the original computing device 102) that is approved by the user. The secondary computing device 102 may be any type of computing device previously described, such as a desktop, laptop, tablet, smartphone, or the like. To be an approved computing device 102, the secondary computing device 102 may, in some embodiments, be required to download, install, and execute the computer program of embodiments of the present invention. In some alternative embodiments, the secondary computing device 102 may be able perform certain functions and features described herein by accessing the web-accessible form the electronic resource of the present invention. With respect to the downloaded computer program, once downloaded, installed, and executed on the approved computing device 102, the user may be required to input security credentials (e.g., username/password, biometrics, or the like) to fully access the computer program and/or the service device 104. As such, the secondary computing device 102 can connect with the server device 104 to retrieve the encrypted data over the communications network 106. In some embodiments, the communications network 106 used by the secondary computing device 102 to receive the encrypted data may be a different network than the communications network 106 used by the original computing device 102 to transmit the encrypted data to the server device 104.

After retrieving the encrypted data from the service device 104, the secondary computing device 102 can, in some embodiments, only decrypt the encrypted data upon obtaining a cryptographic key that matches the cryptographic key that was originally used to encrypt the captured data (or the private key if a public-key scheme was used). Some embodiments of the present invention provide for a matching cryptographic key to be obtained only from the original computing device 102. As such, to obtain the matching cryptographic key, the original computing device 102 and the secondary computing device 102 may need to be connected via a physical interface, such as through wires, cables, or the like. For example, such physical interface may include a serial cable or an Ethernet cable. Once connected via the physical interface, the computer programs of the present invention, existing on each of the computing devices 102, may facilitate the communication between the computing devices 102. In some embodiments, the user of the secondary computing device 102 may be required to enter and/or have verified security credentials (e.g., username/password, biometric information, etc.) in order to access and retrieve the cryptographic keys from the original computing device 102. In other embodiments, the original computing device 102 may send the cryptographic key through a secure software interface (wired or wirelessly). Embodiments of the present invention provide for the establishment of such a secure software interface via the computer program of the present invention. Once connected via the secure software interface, in some embodiments, the user of the secondary computing device 102 may be required to enter and/or have verified security credentials (e.g., username/password, biometric information, etc.) in order to access and retrieve the cryptographic keys from the original computing device 102.

Upon retrieving the cryptographic keys, the encrypted data on the secondary computing device 102 can be decrypted such that the plaintext of the originally-obtained or captured data can be accessed, opened, read, viewed, or the like. The decrypted data can then be stored on the memory elements of the secondary computing device 102 for future access and use, as was previously described.

Figure 3:
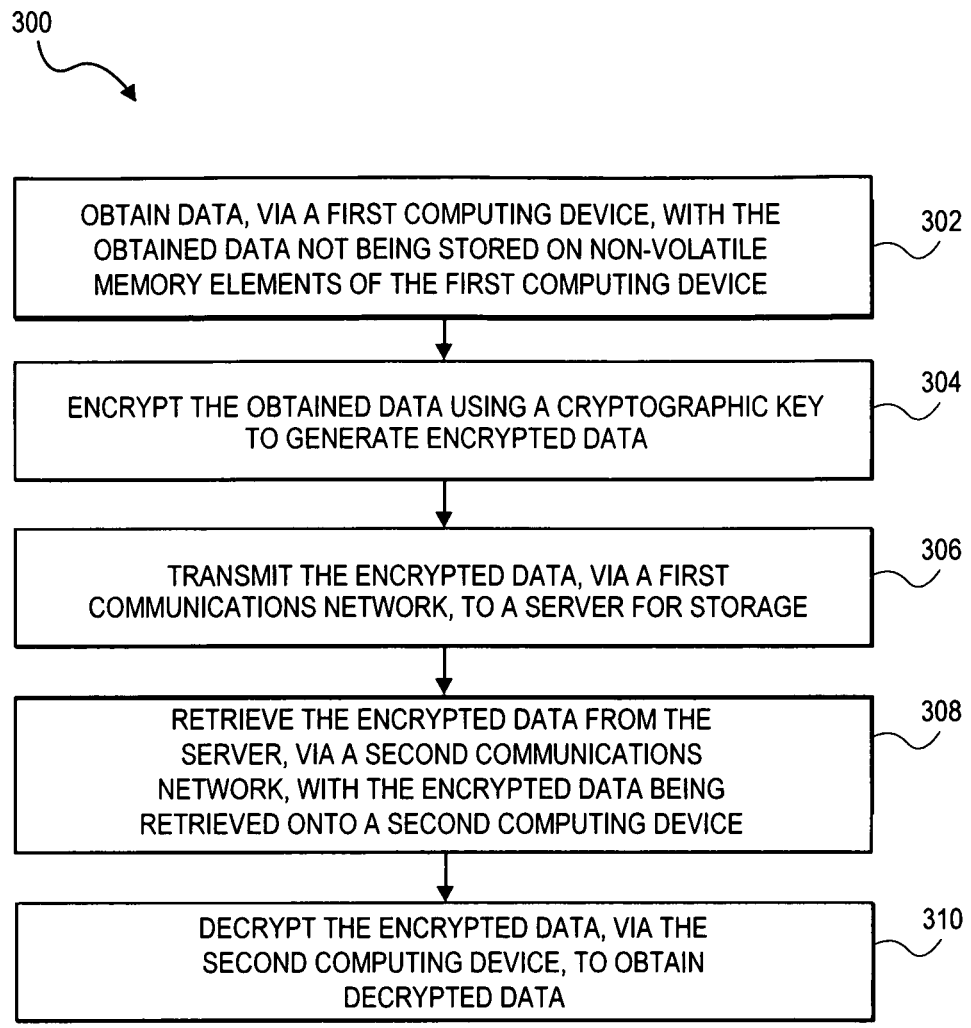
FIG. 3 is a flowchart of an additional method for secure data management according to another embodiment of the present invention.

As such, embodiments of the present invention include an additional method 300, as illustrated in FIG. 3, which comprises an initial Step 302 of obtaining data, via a first computing device 102, with the obtained data not being stored on non-volatile memory elements of the first computing device 102. An additional Step 304 includes encrypting the obtained data using a cryptographic key to generate encrypted data. An additional Step 306 includes transmitting the encrypted data, via a first communications network 106, to a server 104 for storage. An additional Step 308 includes retrieving the encrypted data from the server 104, via a second communications network 106, with the encrypted data being retrieved onto a second computing device 102. A further Step 310 includes decrypting the encrypted data, via the second computing device 102, to obtain decrypted data.

Given the description of the functionality and features provided above, embodiments of the present invention provide for secure capture, transmission, storage, and retrieval of data. In particular, embodiments provide for data captured by a computing device 102 to not be stored on the computing device's 102 non-volatile memory. Instead, the captured data is immediately encrypted and transmitted to a server device 104. As such, if the computing device 102 is lost or compromised (e.g., hacked), the captured data can never be recovered in unencrypted form. Additionally, during transit to and/or from the server device 104 and during storage on the server device 104, the data is, at all times, encrypted. As such, if the transmission signal to and/or from the server device 104 is compromised or if the sever device 104 itself is compromised, the compromised data cannot be recovered in unencrypted form. Thus, only way to access the plaintext of the originally-captured data is to obtain both the encrypted data and the cryptographic keys that were used to encrypt the data. Given the above, embodiments of the present provide for secure capture, transmission, storage, and retrieval of data.

Having thus described various embodiments of the invention, what is claimed as new and desired to be protected by Letters Patent includes the following:

1. A non-transitory computer readable storage medium with a computer program stored thereon for preventing a malicious attack on a mobile computing device to provide secure data management, wherein the computer program instructs a processor to perform the following steps:
   obtain data, via a first computing device, wherein the obtained data is not stored on non-volatile memory elements of the first computing device;
   encrypt, via the first computing device, the obtained data using a cryptographic key generate encrypted data;
   temporarily store the encrypted data on volatile memory elements of the first computing device;
   transmit the encrypted data, via a communications network, to a server for storage,
   wherein the encrypted data is temporarily stored on the volatile memory elements of the first computing device only until the encrypted data is transmitted to the server; upon the encrypted data being transmitted to the server, erase memory locations of the volatile memory elements on which the encrypted data was temporarily stored;
   retrieve the encrypted data from the server; and
   decrypt the encrypted data to obtain decrypted data,
   wherein the encrypted data is decrypted via the cryptographic key, and wherein the cryptographic key is transmitted from the first computing device to a second computing device,
   wherein the cryptographic key is only transmitted to the second computing device upon verification of security credentials entered into the second computing device.

2. The non-transitory computer readable storage medium of claim 1, wherein the obtained data is temporarily stored on volatile memory elements of the first computing device only until the obtained data is encrypted to form the encrypted data.

3. The non-transitory computer readable storage medium of claim 2, wherein upon encrypting the obtained data, memory locations of the volatile memory elements on which the obtained data was temporarily stored are erased.

4. The non-transitory computer readable storage medium of claim 3, wherein the memory locations are erased by overwriting the memory locations with random data.

5. The non-transitory computer readable storage medium of claim 3, wherein the memory locations are erased by disconnecting the memory locations from electrical power.

6. The non-transitory computer readable storage medium of claim 1, wherein the computer program further instructs the processor to generate, via the first computing device, the cryptographic key.

7. The non-transitory computer readable storage medium of claim 1, wherein the cryptographic key is stored on non-volatile memory elements of the first computing device.

8. The non-transitory computer readable storage medium of claim 1, wherein the security credentials comprise at least one of a username and password or biometric information.

9. The non-transitory computer readable storage medium of claim 1, wherein the obtained data is selected from one or more of the following: image data, audio data, and video data.

10. The non-transitory computer readable storage medium of claim 1, wherein the server comprises one or more remote data storage devices in the form of a cloud network.

11. The non-transitory computer readable storage medium of claim 1, wherein the communications network comprises a cellular network.

12. The non-transitory computer readable storage medium of claim 1, wherein the first computing device is a mobile device selected from one of the following: a smartphone, a tablet, and a laptop.

13. One or more non-transitory computer readable storage mediums with executable programs stored thereon for preventing a malicious attack on a mobile computing device to provide secure data management, wherein the programs instruct one or more processors to perform the following steps:
  obtain data via a first computing device, wherein the obtained data is not stored on nonvolatile memory elements of the first computing device;
  encrypt via the first computing device, the obtained data using a cryptographic key to generate encrypted data;
  transmit the encrypted data, via a first communications network, to a server for storage,
  wherein the encrypted data encrypted via the first computing device is temporarily stored on volatile memory elements of the first computing device only until the encrypted data is transmitted to the server, wherein upon transmitting the encrypted data, memory locations of the volatile memory elements on which the encrypted data was temporarily stored are erased;
  retrieve the encrypted data from the server, via a second communications network, wherein the encrypted data is retrieved onto a second computing device; and
  decrypt the encrypted data, via the second computing device, to obtain decrypted data;
  wherein the encrypted data is decrypted via the cryptographic key, and wherein the cryptographic key is transmitted from the first computing device to the second computing device,
  wherein the cryptographic key is only transmitted to the second computing device upon verification of security credentials entered into the second computing device.

14. The non-transitory computer readable storage mediums of claim 13, wherein the cryptographic key is transmitted to the second computing device over a physical interface.

15. The non-transitory computer readable storage mediums of claim 13, wherein the cryptographic key is transmitted to the second computing device wirelessly over a software-defined interface.

16. A computer-implemented method for preventing a malicious attack on a mobile computing device to provide secure data management, the method including the following steps:
  capturing data via a first mobile computing device, wherein the captured data is selected from one or more of the following: image data, audio data, and video data, and wherein the captured data is not stored on non-volatile memory elements of the first mobile computing device;
  encrypting, via the first mobile computing device, the captured data using a cryptographic key to generate encrypted data;
  transmitting the encrypted data, via a communications network, to a server for storage,
  wherein the encrypted data encrypted via the first mobile computing device is temporarily stored on volatile memory elements of the first mobile computing device only until the encrypted data is transmitted to the server, wherein upon transmitting the encrypted data, memory locations of the volatile memory elements on which the encrypted data was temporarily stored are erased;
  retrieving the encrypted data from the server; and
  decrypting the encrypted data to obtain decrypted data,
  wherein the encrypted data is decrypted via the cryptographic key, and wherein the cryptographic key is transmitted from the first mobile computing device to a second mobile computing device,
  wherein the cryptographic key is only transmitted to the second mobile computing device upon verification of security credentials entered into the second mobile computing device.

* * * * *